United States Patent
Iwasaki et al.

(10) Patent No.: US 8,351,760 B2
(45) Date of Patent: Jan. 8, 2013

(54) CONTROLLER, RECORDING DEVICE AND MENU DISPLAY METHOD

(75) Inventors: Shiro Iwasaki, Osaka (JP); Kentaro Tanikawa, Osaka (JP); Kazue Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 430 days.

(21) Appl. No.: 12/650,646

(22) Filed: Dec. 31, 2009

(65) Prior Publication Data

US 2010/0195979 A1    Aug. 5, 2010

(30) Foreign Application Priority Data

Jan. 5, 2009  (JP) ................................ 2009-000078

(51) Int. Cl.
*H04N 9/80* (2006.01)

(52) U.S. Cl. ........................................ 386/243; 386/239

(58) Field of Classification Search .................. None
See application file for complete search history.

(56) References Cited

U.S. PATENT DOCUMENTS

| 7,420,903 | B2 * | 9/2008 | Sakurai et al. | 369/53.2 |
| 2003/0099461 | A1 * | 5/2003 | Johnson | 386/55 |
| 2006/0174301 | A1 | 8/2006 | Hashimoto et al. | |
| 2008/0082921 | A1 * | 4/2008 | Negi | 715/704 |

FOREIGN PATENT DOCUMENTS

| JP | 9-168131 | 6/1997 |
| JP | 2006-94434 | 4/2006 |
| JP | 2006-191348 | 7/2006 |
| JP | 2006-318588 | 11/2006 |
| KR | 667544 | * 1/2007 |

* cited by examiner

*Primary Examiner* — William C Vaughn, Jr.
*Assistant Examiner* — Asher Khan
(74) *Attorney, Agent, or Firm* — Wenderoth Lind & Ponack, L.L.P.

(57) ABSTRACT

A recording device includes a recording medium operable to store a plurality of program streams and information about recording of each program stream, and a controller operable to control display of the program stream recorded on the recording medium on a display device. When receiving an instruction for selecting a predetermined item from among the plurality of selection items, the controller causes the menu image to be displayed, making the menu image include information representing programs corresponding to at least a part of the plurality of program streams recorded on the recording medium, in addition to the plurality of selection items.

14 Claims, 12 Drawing Sheets

*Fig. 2*

PROGRAM INFORMATION
(FOR ONE PROGRAM)

- BROADCAST DATE
- BROADCAST START TIME
- DURATION OF PROGRAM
- BROADCAST STATION
- PROGRAM NAME

*Fig. 3*

(PROGRAM INFORMATION RECORDED IN FLASH MEMORY)

| BROADCAST DATE | BROADCAST START TIME | DURATION OF PROGRAM | BROADCAST STATION | PROGRAM NAME |
|---|---|---|---|---|
| NOV. 20 | 17:00 | 3:00 | 44 | MOVIE ABC |
| ... | ... | ... | ... | ... |
| NOV. 24 | 11:00 | 1:00 | 20 | ANIMATION DD |
| ... | ... | ... | ... | ... |
| NOV. 30 | 10:00 | 2:00 | 35 | DRAMA XYZ |
| ... | ... | ... | ... | ... |
| DEC. 7 | 19:00 | 5:00 | 45 | SPORT A |
| ... | ... | ... | ... | ... |
| DEC. 15 | 20:00 | 0:30 | 105 | ANIMATION Z |
| ... | ... | ... | ... | ... |
| ... | ... | ... | ... | ... |
| ... | ... | ... | ... | ... |

Fig. 5

| | 013 | 014 | 025 | | 037 | 040 | |
|---|---|---|---|---|---|---|---|
| | NNV GENERAL 1 | NNV GENERAL 2 | ABJ | TCCV | | J-TELE | |
| 18 | 00 | 00 | 00 | 00 | | 00 | 18 |
| 19 | 54 | 00 | 00 | 54 | | 00 | 19 |
| 20 | 00 | 00 | 00 | | | 54 | 20 |
| 21 | 00 | 00 | | | | 00 | 21 |

NOV. 14 (TUE)　18:00 – 18:54　　MOVIE ABC (SD)　　ABJ STATION　CHANNEL 025

DO YOU SCHEDULE RECORDING OF MOVIE ABC (SD)?

YES    NO

[DETAILS]

MOVIE ABC   NOV. 14 (TUE)   18:00 – 18:59

Fig. 7

(SCHEDULED RECORDING LIST OF RECORDER)

| BROADCAST DATE | BROADCAST START TIME | DURATION OF PROGRAM | BROADCAST STATION | PROGRAM NAME |
|---|---|---|---|---|
| NOV. 20 | 17:00 | 3:00 | 44 | MOVIE ABC |
| NOV. 30 | 10:00 | 2:00 | 35 | DRAMA XYZ |
| DEC. 15 | 20:00 | 0:30 | 105 | ANNIMATION Z |
| ... | ... | ... | ... | ... |
| ... | ... | ... | ... | ... |
| ... | ... | ... | ... | ... |

Fig. 8

(RECORDING LIST OF RECORDER)

| DATE OF RECORDING | RECORDING START TIME | RECORDING TIME | BROADCAST STATION | PROGRAM NAME | VIEW INFO. |
|---|---|---|---|---|---|
| NOV. 1 | 17:00 | 3:00 | 45 | PROGRAM D | 0 |
| NOV. 2 | 10:00 | 2:00 | 22 | MOVIE DEF | 1 |
| NOV. 3 | 14:00 | 0:35 | 32 | PROGRAM C | 0 |
| NOV. 5 | 22:00 | 2:30 | 39 | SPORT JKL | 1 |
| ... | ... | ... | ... | ... | ... |
| ... | ... | ... | ... | ... | ... |
| NOV. 16 | 16:00 | 1:56 | 55 | PROGRAM B | 0 |
| ... | ... | ... | ... | ... | ... |
| DEC. 1 | 21:00 | 0:56 | 41 | PROGRAM A | 0 |

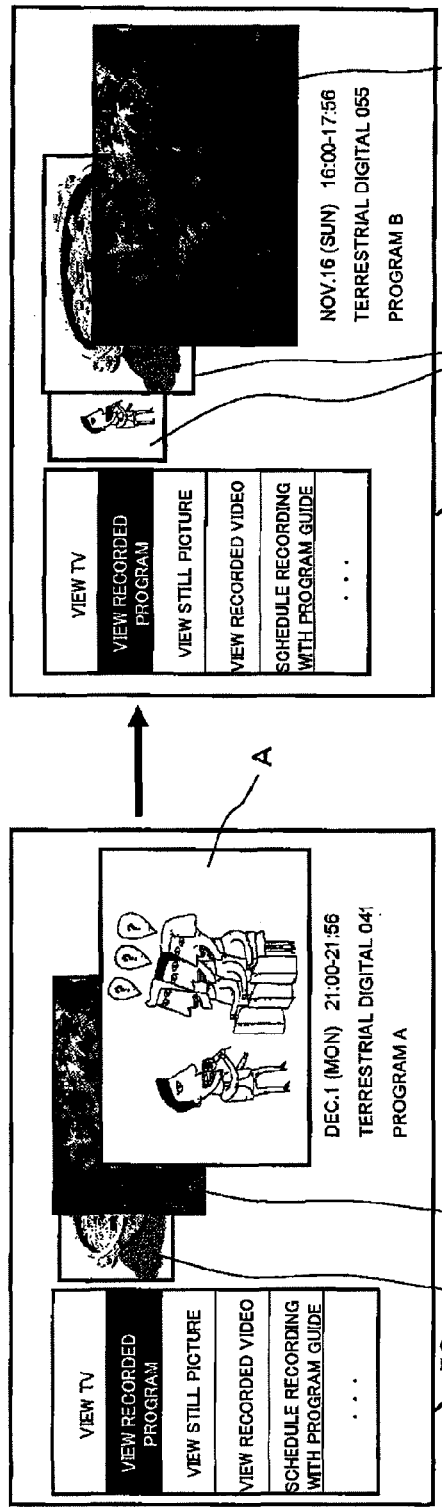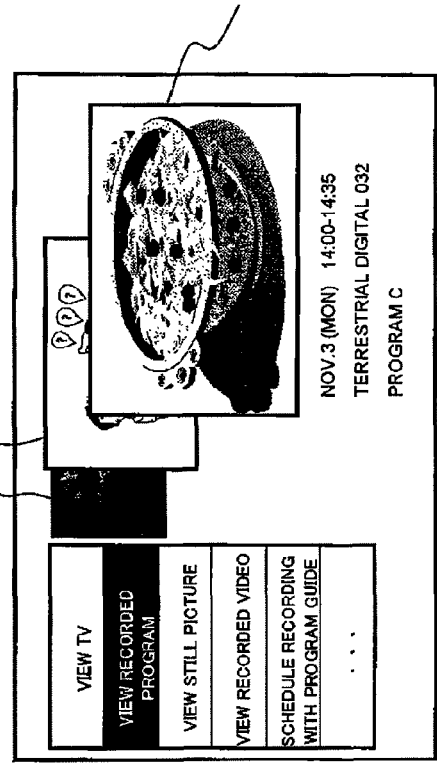
Fig. 10A
Fig. 10B
Fig. 10C

Fig. 11

(INFORMATION OF DISPLAY IMAGE FOR MENU)

| DATE OF RECORDING | RECORDING START TIME | RECORDING TIME | BROADCAST STATION | PROGRAM NAME | REPRESENTATIVE IMAGE |
|---|---|---|---|---|---|
| DEC. 1 | 21:00 | 00:56 | 41 | PROGRAM A | P01001.jpg |
| NOV. 16 | 16:00 | 01:56 | 55 | PROGRAM B | P01002.jpg |
| NOV. 3 | 14:00 | 00:35 | 32 | PROGRAM C | P01003.jpg |
| | | | | | |
| | | | | | |
| | | | | | |
| | | | | | |

CONTROLLER, RECORDING DEVICE AND MENU DISPLAY METHOD

BACKGROUND

1. Technical Field

The present invention relates to a controller and a recording device that can display a menu screen including a plurality of selectable items on a display device.

2. Related Art

Recent video recording devices are equipped with multiple functions. A recording device displays a menu screen showing multiple selection items on a display device. A user can select and decide one item on the menu screen in order to cause the recording device to perform a predetermined function.

For example, when the user selects and decides one selection item (for example "VIEW RECORDED PROGRAM") on a menu screen, a conventional recording device displays a screen including a list of recorded programs (recording list) on the display device. Then, when the user selects and decides one program, the recording device sends a stream (for example, video and audio streams) of the selected and decided program to the display device and an amplifier. The recording device can perform scheduled recording by using future program information, as disclosed in JP2006-094434A. In other words, the user can perform the scheduled recording even when the user does not remember broadcasting hours.

In order to confirm the recorded programs in the Above-described recording device, the user needs to display a recording list screen by selecting and deciding a selection item displayed on the menu screen. In other words, on the menu screen initially displayed, the user cannot determine what kind of programs are recorded.

Recently, the scheduled recording can be easily made as disclosed in JP2006-094434A, and it is difficult for the user to understand when the recorded programs were recorded by scheduled recording. Therefore, a function for allowing the user to easily understand the programs recorded by scheduled recording is desired.

SUMMARY

It is an object of the present invention to provide a recording device for allowing a user to easily confirm recorded programs and a controller used for such a recording device. For example, the object of the present invention is to provide a recording device and a controller that can allow the user to easily recognize that a program is recorded even when the user does not remember recording hours.

According to a first aspect, a controller connectable to a recording medium that stores a plurality of program streams and information about recording of each program stream is provided. The controller includes a display controller operable to control a display device, and a receiving unit operable to receive an instruction provided by a user. The display controller controls the display device to display a menu image including a plurality of selection items. When the receiving unit receives an instruction for selecting a predetermined item from among the plurality of selection items, the display controller controls the display device to display the menu image including not only the plurality of selection items but also information representing programs corresponding to at least a part of the plurality of the program streams recorded on the recording medium.

According to a second aspect, a recording device is provided that includes a recording medium operable to store a plurality of program streams and information about recording of each program stream, a receiving unit operable to receive an instruction provided by a user, and a controller operable to control display of the program stream recorded on the recording medium on a display device. The controller controls the display device to display a menu image including a plurality of selection items. When the receiving unit receives an instruction for selecting a predetermined item from among the plurality of selection items, the controller controls the display device to display the menu image including not only the plurality of selection items but also information representing programs corresponding to at least a part of the plurality of the program streams recorded on the recording medium.

According to a third aspect, a method for displaying a menu image including a plurality of selection items on a display device is provided. The plurality of selection items include an item that is selected to execute a function of reproducing a program stream recorded on a recording medium. The method includes receiving operation performed by a user on a menu image, causing the display device to display the menu image including plurality of selection items and information representing a program corresponding to the program stream recorded on the recording medium, when an operation for selecting an item for reproducing a program stream from among the plurality of selection items is received on the menu image.

According to the present invention, the information about the recorded programs is displayed only by selecting, on the menu screen, the selection item about playback of the recorded program. Accordingly, the user can easily recognize that the program has been recorded even when the user does not remember the date and time of recording the program, resulting in higher convenience to users.

BRIEF DESCRIPTION OF DRAWINGS

FIG. 2 is a diagram showing an example of program information transmitted from a broadcast station (Electric Program Guide (EPG) data).

FIG. 3 is a diagram showing an example of program information recorded in a flash memory.

FIG. 5 is a diagram showing an example of a program guide.

FIG. 6 is a diagram showing an example of a confirmation screen of scheduled recording.

FIG. 7 is a diagram for illustrating a scheduled recording list of the recorder according to the first embodiment.

FIG. 8 is a diagram for illustrating a recording list of the recorder according to the first embodiment.

FIG. 10 is a diagram for illustrating an example of a transition of the menu screen display according to the first embodiment.

FIG. 11 is a diagram for illustrating an example of information about a display image for menu.

DETAIL DESCRIPTION

Figure 1:
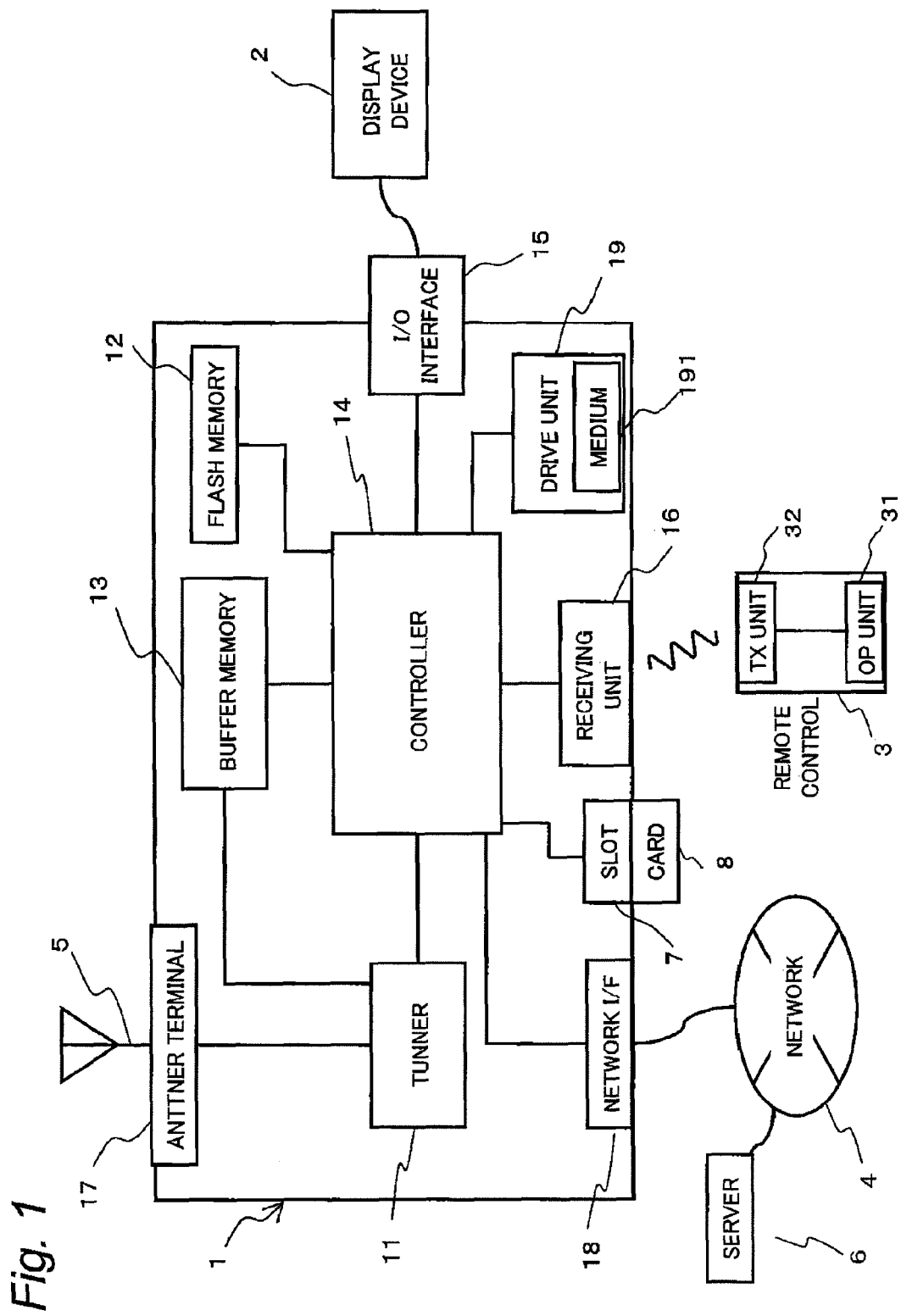
FIG. 1 is a block diagram showing a configuration of a recorder according to a first embodiment of the present invention.

Embodiments of the present invention will now be described with reference to the attached drawings.

A. First Embodiment

1. Overview

A recorder receives a broadcast signal from a broadcast station. The broadcast signal includes a plurality of program streams. The broadcast signal also includes program information. The program information includes information about a program stream currently broadcast and/or information about program stream to be broadcast in the future. The program information includes "a program name", "a broadcast start time", "a broadcast station", and the like of a program stream.

The recorder allows a plurality of pieces of received program information to be displayed, as a display screen (program guide), on a display device. When one piece of program information is selected and decided from among the plurality of pieces of program information based on operational instruction given by the user, the recorder adds this decided program information to a scheduled recording list. The recorder records the program stream included in the broadcast on a recording medium in a drive device, based on this scheduled recording list. When recording the program stream on the recording medium, the drive device stores the time at which the recording of the program started (hereinafter referred to as "recording start time") in association with the program stream. In the following embodiments, a controller generates recording information, and records the recording information on the recording medium as a recording list. It should be noted that the recording list includes view information indicating whether the program stream has been viewed by the user. When a program stream is recorded, information indicating that the program stream has not yet been viewed by the user is recorded on the view information. When the recorded program stream is viewed by the user, information indicating that the program has been viewed by the user is recorded on the view information.

When the recorder receives an instruction for turning off the power generated by user operation, the recorder selects a part of the program streams from among the recorded plural program streams, based on the recording start time and the view information recorded in the recording medium, before the recorder turns off the power. Then, the recorder reads the motion pictures of the selected program streams from the recording medium, and obtains a still picture of the read motion picture at a predetermined playback time. The recorder stores the obtained still picture, as a display image for menu (representative image), in a flash memory.

The recorder displays the plurality of items, as a menu screen, on the display device. The plurality of items include an item about a function of reproducing the recorded program, namely "VIEW RECORDED PROGRAM". When the item "VIEW RECORDED PROGRAM" is selected based on an operational instruction by the user, the recorder displays a display screen using the display image for menu without transiting the screen. In other words, when a predetermined item is selected, the recorder controls a display device 2 to display the display screen for menu while maintaining the display of the plurality of selection items. It should be noted that examples of screens using the display image for menu will be described later.

With the above configuration, the user can understand content of the recorded program while selecting an item on the menu screen. In addition, the recorder can generate the display image for menu based on the recording start time and the view information, and therefore the recorder can easily notify the user of recording of programs recorded by the scheduled recording.

2. System Configuration

With reference to FIG. 1, a configuration of a system including the recorder according to the present embodiment will now be described. A recorder 1 can be connected to the display device 2, a network 4, and an antenna 5 via a wire or wireless connection.

The antenna 5 receives a broadcast signal transmitted from a broadcast station, and transfers the received broadcast signal to the recorder 1. The antenna 5 can be implemented as, for example, a UHF antenna or a parabolic antenna. The broadcast station uses a transmitter for broadcast (broadcast wave transmitter) to transmit radio waves. The antenna 5 receives the broadcast signal including the program streams and the program information by receiving this radio wave.

The network 4 is connected to a server 6 and the like possessed by the broadcast station. For example, the network 4 serves as a communication channel that connects the server 6 with the recorder 1. The server 6 can receive the signal from the recorder 1 via the network 4. In addition, the server 6 can transmit information stored in the server 6 to the recorder 1 in response to the signal transmitted from the recorder 1. For example, the server 6 can transmit plural pieces of program information constituting a program guide to the recorder 1.

A remote controller 3 receives a user instruction, and transmits an operational signal to the recorder 1 in accordance with the instruction. The remote controller 3 includes an operational unit 31 and a transmitting unit 32. The operational unit 31 includes a plurality of buttons, and notifies that the button is operated by the user. The transmitting unit 32 transmits an operational signal corresponding to the operation detected by the operational unit 31 to the recorder 1.

The display device 2 displays an image on a display, based on an image signal transmitted from the recorder 1. The display device 2 can be, for example, a liquid crystal display, a plasma display, and an organic EL display, but is not limited thereto.

3. Configuration of Recorder

The recorder 1 includes a tuner 11, a flash memory 12, a buffer memory 13, a controller 14, an input/output interface 15, a receiving unit 16, an antenna terminal 17, a memory card slot 7, a network interface 18, a drive device 19, and the like.

The tuner 11 is a device including a tuning circuit. The tuner 11 obtains a broadcast signal received by the antenna 5 via the antenna terminal 17. The broadcast signal includes one or more of broadcast streams and program information corresponding to program streams broadcast in the future (Electric Program Guide (EPG) data). The program stream includes a video signal, an audio signal, data, and the like. As shown in FIG. 2, the program information includes data such as "broadcast date", "broadcast start time", "duration of program", "broadcast station", and "program name" for each program.

The tuner 11 can separate one program stream from the plurality of program streams included in the broadcast signal. The tuner 11 decodes the separated program stream, and stores the decoded program stream in the buffer memory 13. Further, the tuner 11 can separate program information from the broadcast signal. The tuner 11 stores the separated program information in the buffer memory 13. In the present embodiment, the tuner 11 has the function of decoding the program stream. Alternatively, the controller 14 may have such function.

The controller 14 may be implemented by a microcomputer and controls each of units in the recorder 1. Alternatively, the controller 14 may be implemented by a hardwired circuit.

The controller 14 obtains the program stream stored in the buffer memory 13 with the tuner 11. The controller 14 can store the obtained program stream in the flash memory 12. Alternatively, the controller 14 may transmit the obtained program stream to the drive device 19, so that the program stream is stored in a recording medium 191 of the drive device 19.

The controller 14 obtains the program information stored in the buffer memory 13 with the tuner 11, and stores the program information in the flash memory 12. In the above description, the program information is assumed to be obtained from the broadcast signal. However, the way of obtaining the program information is not limited thereto. Alternatively, the program information may be obtained from the server 6 such as a broadcast station via the network 4. In this case, the controller 14 transmits a request signal for requesting the program information to the server 6 at a predetermined timing (for example, at timing at which the program information is provided to the user). When receiving the request signal, the server 6 transmits the program information. In this manner, the controller 14 can obtain the program information from the server 6. The program information stored in the flash memory 12 is, for example, information as shown in FIG. 3.

The controller 14 can receive the operational signal transmitted from the remote controller 3 via the receiving unit 16. The receiving unit 16 is a sensor for receiving information transmitted from the remote controller 3. The receiving unit 16 transmits the received information to the controller 14. The receiving unit 16 can be implemented by, for example, an infrared sensor.

The controller 14 can transmit program streams and program information to the display device 2 via the input/output interface 15. The display device 2 displays a display screen based on the information received from the controller 14.

The buffer memory 13 serves as a work memory When the controller 14 performs control processing. The buffer memory 13 can be implemented by, for example, a DRAM.

The flash memory 12 is used as an internal memory. The flash memory 12 can store programs and setting values used for controlling the antenna terminal 17. In addition, the flash memory 12 can store the program stream and the program information.

The drive device 19 can be implemented by, for example, a hard disk drive or a BD drive. The drive device 19 stores the program stream transmitted from the controller 14 in the recording medium 191. The recording medium 191 of the drive device 19 which stores program streams may be a hard disk fixedly arranged in the recorder 1 or may be a detachable recording medium, for example, an optical disk such as a BD and a DVD.

The memory card slot 7 is a slot into which a memory card 8 is loaded. The memory card 8 can be loaded into commercially-available video camcorders and digital cameras. The memory card 8 can store motion picture data taken by a video camcorder and still picture data taken by a digital camera.

The recorder 1 is made to be connectable to a household power source. The recorder 1 operates by supplying electric power to each unit of the recorder 1 from the household power source. The type of the power source is not especially limited. For example, the recorder 1 may be supplied with power from a secondary battery.

4. Operation of Recorder

Figure 4:
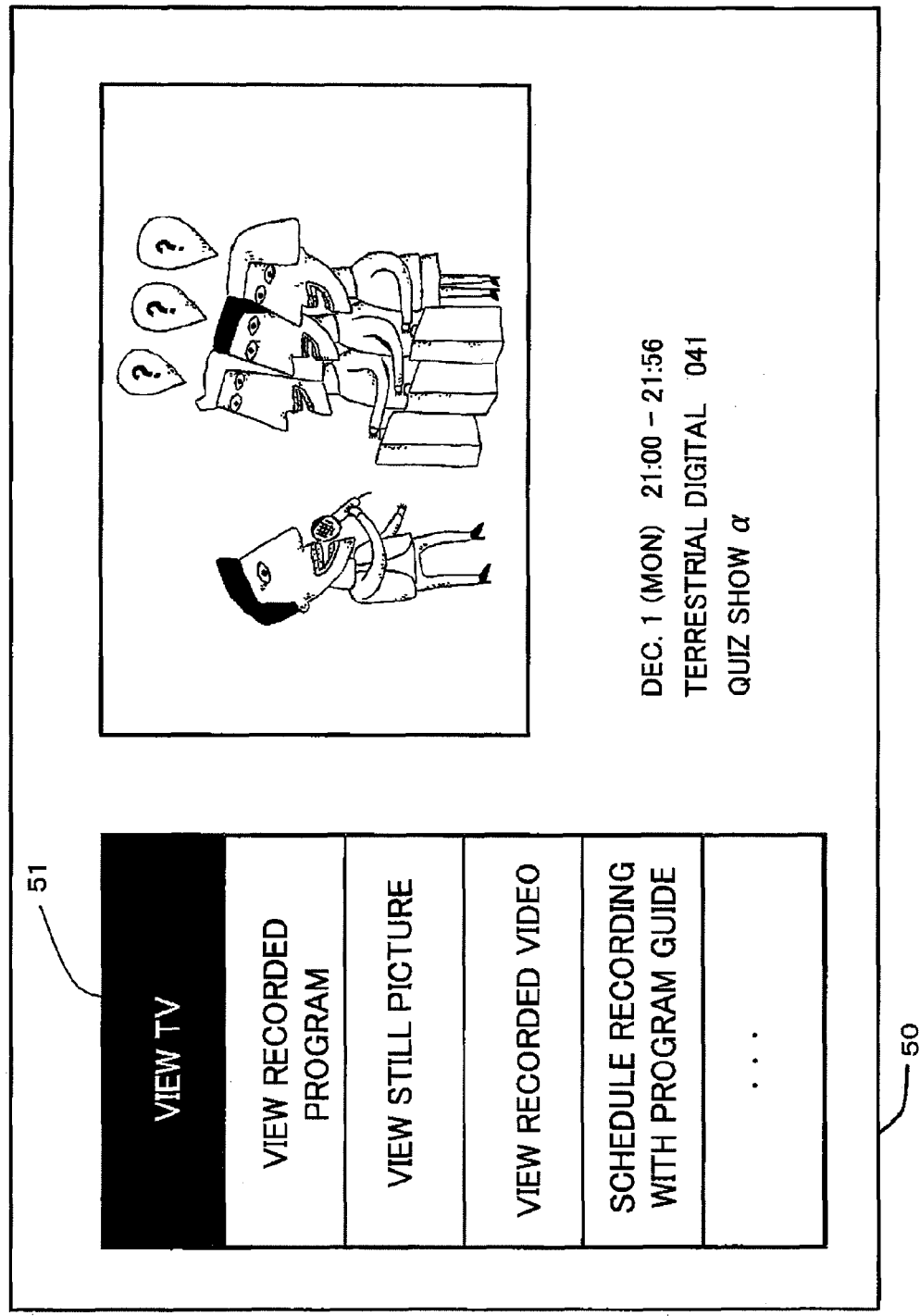
FIG. 4 is a diagram showing an example of a menu screen of the recorder according to the first embodiment.

When the recorder 1 (controller 14) receives an instruction for displaying a menu screen by user operation (an operational signal provided by the remote controller 3), the recorder 1 (controller 14) displays a menu screen 50 as shown in FIG. 4 on the display device 2. The menu screen 50 is a display screen including a plurality of selection items 51. The plurality of selection items 51 include "VIEW TV", "VIEW RECORDED PROGRAM", "VIEW STILL PICTURE", "VIEW RECORDED VIDEO", "SCHEDULE RECORDING WITH PROGRAM GUIDE", "SCHEDULE RECORDING BASED ON RECOMMENDED PROGRAM INFORMATION", and the like.

The user can manipulate up and down keys arranged on the remote controller 3 (examples of buttons constituting the operational unit 31) to select one of the plurality of selection items 51. Specifically, when the up and down keys of the remote controller 3 are manipulated, the recorder 1 switches selection of the selection items. When a set key of the remote controller 3 (an example of buttons constituting the operational unit 31) is pressed, the recorder displays a next display screen according to the selected selection item.

When the user views a broadcast program, "VIEW TV" is selected. When the user wants to playback a program stream, still picture data, or a motion picture data stored in the recording medium 191 or the memory card 8, the selection items of "VIEW RECORDED PROGRAM", "VIEW STILL PICTURE", or "VIEW RECORDED VIDEO" is selected.

When the user sets scheduled recording using an Electric Program Guide (EPG), "SCHEDULE RECORDING WITH PROGRAM GUIDE" is selected.

The operation of the recorder 1 with the menu screen 50 displayed in response to predetermined user's operation will be described below.

4.1 Operation Performed when Selection Item of "SCHEDULE RECORDING WITH PROGRAM GUIDE" is Selected and Decided Operation of the recorder 1 for scheduled recording, when the selection item "SCHEDULE RECORDING WITH PROGRAM GUIDE" is selected and decided on the menu screen 50 will be described. That is, scheduled recording based on Electric Program Guide (EPG) will be described.

When "SCHEDULE RECORDING WITH PROGRAM GUIDE" is selected and decided according to a user's instruction, the controller 14 reads the plurality of pieces of program information (for example, program name) recorded in the flash memory 12, converts the read program information into information for display, and outputs the converted information to the display device 2. For example, the display screen (Electric Program Guide) as shown in FIG. 5 is displayed on the display device 2. On the screen of the display device 2, the plurality of program names are merged and displayed in a two-dimensional matrix form defined by the start time and the channel.

In this situation, the user can select one desired program from among the plurality of programs with the remote controller 3. When the desired program is selected by the user, a recording confirmation screen about the selected program is displayed on the display device 2 as shown in FIG. 6. The user can give an instruction for scheduled recording of the selected program on the recording confirmation screen. The controller 14 receives the instruction for scheduled recording of the program selected from the electronic program guide in accordance with the operational signal provided by the remote controller 3. Then, the controller 14 stores the program information about the program for which the instruction for scheduled recording is received, in the flash memory 12, as a scheduled recording list. FIG. 7 is an example of the scheduled recording list.

Thereafter, the controller 14 performs recording based on the program information in the scheduled recording list. The recording operation of the recorder 1 will be hereinafter briefly described.

When the system time of the recorder 1 reaches the start time of the program information in the scheduled recording list, the controller 14 sets the broadcast station, that is, channel, included in the program information to the tuner 11. The system time is measured by a timer arranged on the controller 14. The controller 14 transmits the program stream stored in the buffer memory 13 by the tuner 11 to the drive device 19, and the program stream is recorded on the recording medium 191 by the drive device 19.

At this occasion, the controller 14 generates recording information including "date of recording", "recording start time", and "view information", and stores them as a recording list in the recording medium 191 of the drive device 19. "View information" stores either "1" indicating that the program has been already viewed or "0" indicating that the program has not been viewed yet. For example, the controller 14 generates the recording information based on the system time at which the recorder 1 start to record the program stream. More specifically, in a case where the system time at which the controller 14 instructed the drive device 19 to record the program stream is "17:00, November 20", the controller 14 generates recording information in which "date of recording" is "November 20", "recording start time" is "17:00", and "view information" is "0". As described above, according to the present embodiment, in the recording list, "date of recording" and "recording start time" are set based on the system time, and "recording time", "broadcast station", and "program name" are set based on the program information of the recorded programs.

The recording list according to the present embodiment includes not only "date of recording", "recording start time", and "view information" but also "recording time", "broadcast station", and "program name". In this case, the controller 14 may generate the recording information (recording list) including "recording time", "broadcast station", and "program name" as shown in FIG. 8. For example, the controller 14 can generate the recording information using the program information in the scheduled recording list. More specifically, when "movie ABC" in the scheduled recording list shown in FIG. 7 is to be recorded, the controller 14 can generate the recording information in which "recording time" is "3:00", "broadcast station" is "44", and "program name" is "movie ABC", based on information in the scheduled recording list, i.e., "duration of program", "broadcast station", and "program name".

Further, in the present embodiment, "date of recording" and "recording start time" are generated based on the system time, and "recording time", "broadcast station", and "program name" are generated based on the program information about the recorded program. However, the present invention is not limited thereto. The recording information may be generated based on only the program information, or on other information.

After the recording start, when detecting that time equal to the duration passes from the start time by using the system time of the recorder 1, the controller 14 stops selection of the program stream in the tuner 11. Further, the controller 14 stops transmission of the program stream to the drive device 19. As a result, the recording of the program stream is terminated.

It should be noted that the controller 14 transmits the generated recording information to the drive device 19. The drive device 19 adds the received recording information to the recording list in the recording medium 191 (i.e., updates the recording list). At this occasion, the drive device 19 records the recorded program stream in association with the recording information.

It should be noted that the recording based on the scheduled recording list is conventional art. The scheduled recording method is not limited thereto. It can be implemented by various methods.

As described above, the recorder 1 executes recording operation when "SCHEDULE RECORDING WITH PROGRAM GUIDE" is selected from the menu screen.

4.2 Operation Performed when Selection Item of "VIEW RECORDED PROGRAM" is Selected Subsequently, operation performed when the selection item "VIEW RECORDED PROGRAM" is selected from among the selection items 51 in the menu screen will be described. It should be noted that the following operation is an operation performed when one selection item is being selected by the remote controller 3, but not an operation performed when the selection item is decided.

In the present embodiment, when the selection item "VIEW RECORDED PROGRAM" is selected, the menu screen 50 includes information that enables the user to easily recognize that the program stream has been recorded on the recording medium 191.

More specifically, when the selection item "VIEW RECORDED PROGRAM" is selected according to user's instruction (an operational signal sent by the remote controller 3), the controller 14 reads information about display image for menu that is recorded in the flash memory 12. The display image for menu is an image including information about the recorded program (still picture, program name, and the like). The details of the display image for menu will be described later.

When the controller 14 reads the information about the display image for menu from the flash memory 12, the controller 14 generates a display screen (menu screen) including the plurality of selection items 51 and the display image for menu arranged on a side of the selection items 51, and displays the display screen (menu screen) on the display device 2. Specifically, when the selection item "VIEW RECORDED PROGRAM" is selected, the controller 14 controls the display device 2 to display the display image for menu while maintaining the display of the selection items 51.

Figure 9:
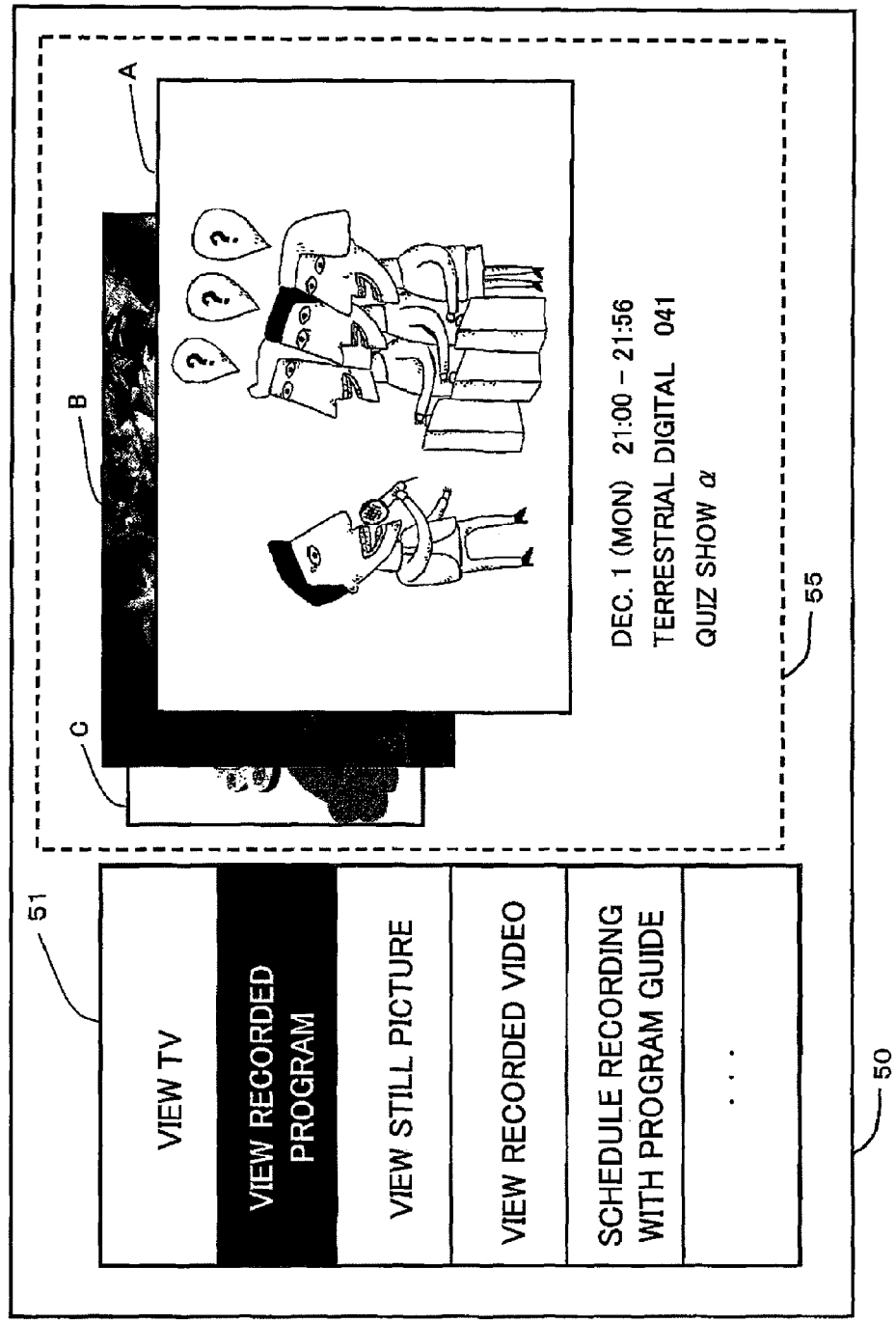
FIG. 9 is a diagram for illustrating an example of a screen displayed when a selection item "view the recorded program" is selected on the menu screen.

FIG. 9 shows an example of the display screen 50 including the plurality of selection items 51 and the display image for menu 55. The display image for menu 55 is arranged on the side of the plurality of selection items 51. The display image for menu 55 includes representative images A to C and information (text information) about "date of recording", "broadcast station", "program name", and the like of a program corresponding to the representative image A. The representative images A to C are overlaid and displayed in such a manner that a portion of each image is visible. By displaying the images in a manner that each image is not completely hidden, the image on which the other image is overlaid can be recognized to some extent.

In the present embodiment, the controller 14 generates the representative images included in the display image for menu regarding a predetermined number (three in the present embodiment) of programs in the descending order of the recording time of the recorded program. The controller 14 records the generated representative images together with, the program information of the corresponding programs in the flash memory 12.

With reference to FIGS. 10A to 10C, a method for displaying the display image for menus 55 will be described. The representative images A, B, and C are representative images for "Program A", "Program B", and "Program C", respectively. "Program A", "Program B" and "Program C" have later recording start time in this order. When reading the information about the display image for menu from the flash memory 12, the controller 14 displays the representative images A to C in a manner that images are overlaid partially with the image having the later recording time displayed upper. Since "Program A", "Program B" and "Program C" is later in this order, the representative image A is first displayed on the most foreground, and the representative images B and C follow in this order in an overlaying manner as shown in FIG. 10A. Further, the controller 14 also displays the program name and the like of the program corresponding to the representative image A. In this state, the controller 14 displays the display image for menu 55 for a predetermined period of time (for example, five seconds). After the predetermined period of time passes, the controller 14 changes the order in which the representative images A to C are overlaid in the display image for menu 55. Specifically, as shown in FIG. 10B, the representative images A to C are displayed, overlaid in the order of the representative image B, the representative image C, and the representative image A from the upper side. In addition, the program name and the like of the program corresponding to the representative image B on the most upper side are also displayed. In this state, the display image for menu 55 is displayed for the predetermined period of time (for example, five seconds). After the predetermined period of time passes, the display image for menu 55 is changed likewise as shown in FIG. 10C. Specifically, the representative images A to C are displayed, overlaid in the order of the representative image C, the representative image A, and the representative image B from the upper side. In addition, the program name and the like of the program corresponding to the representative image C on the most upper side are also displayed. In this state, the display image for menu 55 is displayed for the predetermined period of time (for example, five seconds). After the predetermined period of time passes, the display image for menu 55 is displayed such that the representative image A is displayed on the most upper side again as shown in FIG. 10A. Thereafter, while the selection item "VIEW RECORDED PROGRAM" is selected, the controller 14 displays the display image for menu 55 while cyclically changing the representative image displayed on the most upper side every time the predetermined period of time passes.

The display image for menu 55 is generated and displayed according to the above method, so that the user can easily know the recording of the program that is scheduled to be recorded.

4.3 Generation of Information about Display Image for Menu

Operation for generating information about the display image for menu will be described below.

The controller 14 generates information about the display image for menu at a predetermined timing. In the present embodiment, the predetermined timing is a timing at which an instruction is given to change state of the power supply of the recorder 1 from ON state to OFF state (including a standby state) in accordance with user operation. The standby state is a state in which some units of the system are activated but the other units are inactivated. The generating operation will be hereinafter more specifically described.

The controller 14 detects that an instruction has been given by the user operation to change the state of the power supply of the recorder 1 to OFF state. Operation by the user for the instruction to change the state of the power supply to OFF state may include, for example, manipulation of a power button (not shown) of the recorder 1, manipulation of the operational unit 31 (button corresponding to the power button) of the remote controller 3.

When the controller 14 receives the instruction to change the state of the power supply to OFF state, the controller 14 reads the recording list (see FIG. 8) recorded on the recording medium 191 via the drive device 19. Then, the controller 14 selects recording information for programs which have not been viewed yet from the recording list. Specifically, the controller 14 selects the recording information of which "view information" is "0". For example, the controller 14 selects recording information of "Program A", "Program B", "Program C", and "Program D" from the recording list of FIG. 8. As a result, the information representing the program of the program stream that has not yet been viewed by the user can be displayed on the menu screen.

Thereafter, the controller 14 selects a predetermined number (for example, three) of pieces of recording information in reverse chronological order of the recording start time from among the selected recording information. For example, the controller 14 selects three programs, i.e., "Program A", "Program B", and "Program C" that have later recording start times from among the above selected four programs.

The controller 14 sequentially reads the program stream corresponding to the selected recording information from the recording medium 191 via the drive device 19. At this occasion, the controller 14 reads the program stream for a predetermined playback time (for example, 70 seconds) from the beginning of the program. For example, the controller 14 reads a program stream so as to obtain the program stream for a playback time of 70 seconds from the beginning of the recording. The controller 14 stores, as a representative image, a still picture in the read program stream located at a point the predetermined playback time (70 seconds) elapses after the beginning of the recording, in the flash memory 12. In addition, the controller 14 records the program name and the like obtained from the recording information in the flash memory 12. The controller 14 obtains the representative images, the program names, and the like of the three sequentially read program streams, and records them on the flash memory 12. The representative images, the program names, and the like generated in this manner are the information about the display image for menu. When the information about the display image for menu is completely recorded on the flash memory 12, the controller 14 turns off each unit in the recorder 1 so as to stop the supply of electric power to each unit. FIG. 11 shows an example of the information about the display image for menu recorded in the flash memory 12.

As described above, the recorder 1 generates the information about the display image for menu when the user turns off the recorder 1.

In the present embodiment, the controller 14 when reading the recorded program stream does not read the entire program stream but reads only a portion of the program stream. This arrangement can reduce time to generate the display image for menu.

The reason why the display image for menu is generated at the predetermined timing (when the power is off) as described above is as follows. If the controller 14 generates the display image for menu while a selection item in the menu screen display is selected or when the selection item "VIEW RECORDED PROGRAM" is selected, it takes much time to start display of the display image for menu on the menu screen.

4.4 Update of View Information in Recording List

Update of "view information" in the recording list performed when the program stream recorded on the recording medium 191 is viewed will be described.

Figure 12:
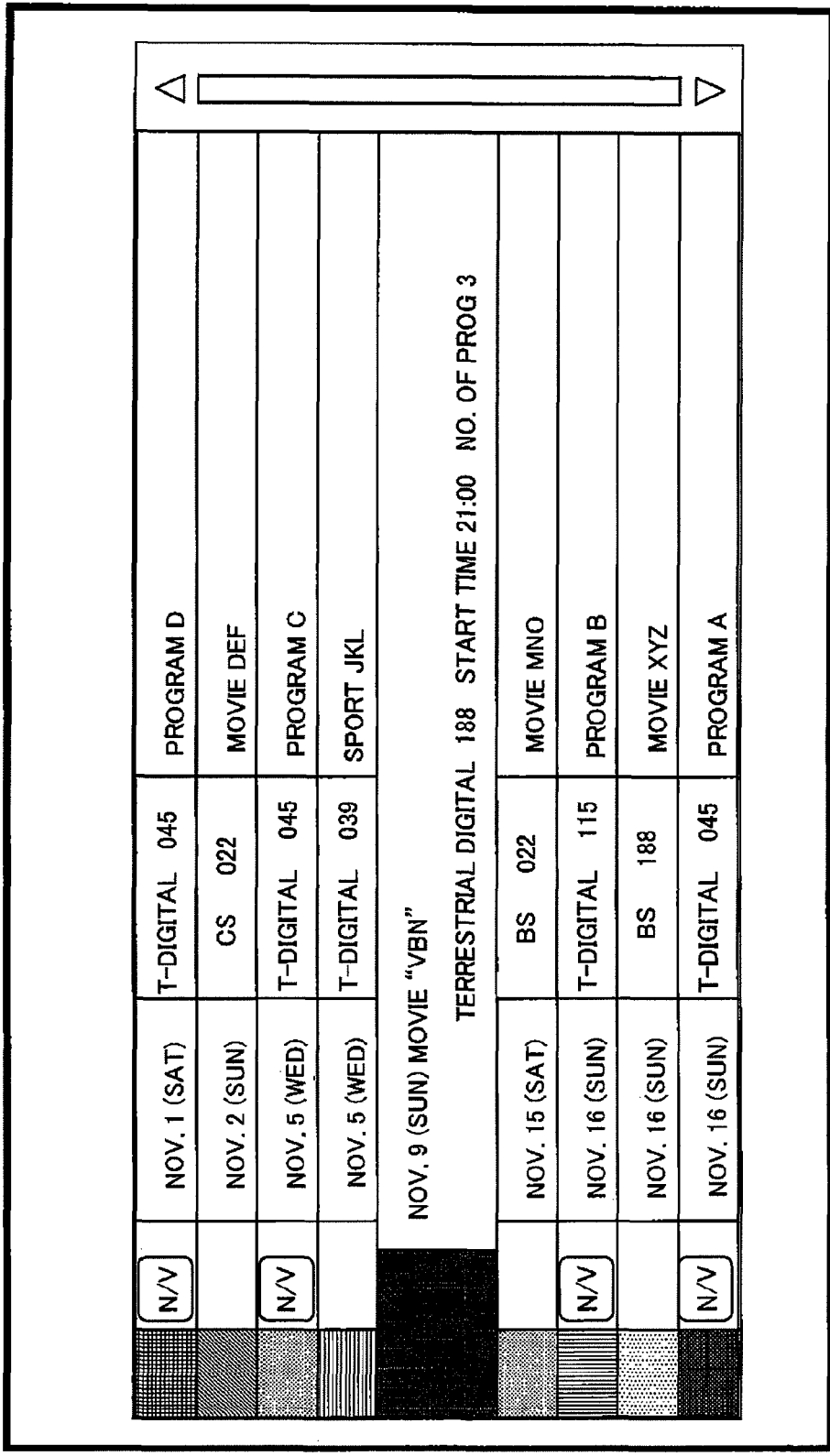
FIG. 12 is a diagram for illustrating a display example of a recording list.

When the selection item "VIEW RECORDED PROGRAM" is selected and decided, the controller 14 displays the recording information recorded on the recording list on the display device 2, as the display screen (recording list) 57, as shown in FIG. 12. More specifically, the controller 14 reads the recording list from the recording medium 191 via the drive device 19. The controller 14 displays the display screen 57 presenting the recording list read from the recording medium 191 on the display device 2.

Thereafter, when any one of the programs is selected from the recording information and is decided, the controller 14 reads the program stream corresponding to the decided recording information and displays the program stream on the display device 2. In other words, the recorder 1 reproduces the program stream corresponding to the decided recording information.

When the "view information" of the recording information corresponding to the reproduced program stream is "0", the controller 14 provides the derive device 19 an instruction to update the "view information" to "1". The drive device 19 updates the target "view information" in the recording list (recording information) to "1" according to the instruction provided by the controller 14.

5. Correspondence of Terms

The recorder 1 is an example of a recording device. The controller 14 is an example of a controller. The controller 14 also serves as an example of information acquisition unit, display controller, selecting unit, stream acquisition unit, receiving unit, and recording unit. The recording start time is an example of information about time. The representative image and the program name are examples of information representing a program. The selection item of "VIEW RECORDED PROGRAM" is an example of the predetermined item. The view information is an example of information about viewing.

6. Summary

According to the present embodiment, the recorder 1 includes the controller 14 and the derive device 19 including the recording medium 191. The recording medium 191 stores a plurality of program streams and time (recording start time) at which the recorder 1 starts to record each program stream. The controller 14 includes an information acquisition unit for selecting a part of the program streams from among the plurality of recorded program streams based on the recording start time and obtaining the display image for menu of the selected program streams, a display controller for controlling the display device to display the plurality of items including the predetermined item as the display image, and a selecting unit for selecting one item from among the plurality of items based on an operational instruction provided by the user. Then, when the predetermined item is selected, the display controller in the controller 14 controls the display device 2 to display the menu screen with the plurality of items being displayed.

With this configuration, the user can see the information representing the recorded program on the item selection screen without any screen transition. For example, the user can see the information representing the recorded program in the selection screen without any screen transition, so that the user can easily understand that the scheduled program has been recorded.

B. Other Embodiments

The other embodiments will be described hereinafter.

In the first embodiment, the controller 14 provided in the recorder 1 is described as an example of the control device. However, the embodiment is not limited thereto. The present invention may be applied to an LSI provided in a television receiver. In this case, for example, the television receiver includes a hard disk drive, and records program streams in the hard disk drive.

The recorder 1 and the display device 2 may be connected via a wire or wirelessly. The recorder 1 and the display device 2 may be connected directly or via another apparatus such as a set top box.

In the first embodiment, a timing at which the recorder 1 is turned off is described as an example of the predetermined timing at which the information about the display image for menu 55 is generated. However, the embodiment is not limited thereto. The predetermined timing may be a timing at which the recording list is updated.

For example, the program used in the display image for menu 55 (for example, "Program A") may be deleted in the recorder 1. The following problem is considered. After "Program A" is deleted, when the selection item "VIEW RECORDED PROGRAM" is selected on the menu screen in the situation that the recorder 1 is not turned off yet, there may arise a malfunction in that the representative image of "Program A" is displayed on the display device 2 although "Program A" is already deleted. Likewise, there also may arise the malfunction when a new program stream is recorded. In other words, when the selection item "VIEW RECORDED PROGRAM" is selected in the situation that the recorder 1 is not turned off after a new program stream is recorded, information including a representative image (display image for menu 55) for the program of the newly recorded program stream is not displayed on the display device 2. Therefore, in order to solve the above problem, the information about the display image for menu should be updated at the timing at which the recording list is updated. The timing at which the recording list is updated is considered to be, for example, a timing at which a new program stream is recorded (recording end time), a timing at which a recorded program is deleted, a timing at which a recorded program is divided into two or more programs, and a timing at which a recorded program is reproduced. It should be noted that the timing at which the recording list is updated includes not only a timing at which the recording list itself is Update but also a timing at which operation related to the update of the recording list is performed. The timing at which the related operation is performed includes, for example, a timing at which deletion of a program is received and a timing at which a program recording instruction is received.

Alternatively, the information about the display image for menu 55 may be generated at a predetermined time. Alternatively, the information about the display image for menu 55 may be generated while the program stream is being recorded.

In the first embodiment, the still picture in the program stream is used as the representative image. Alternatively, the representative image may be a motion picture.

In the first embodiment, a still picture located at a point the predetermined playback time elapses after the beginning of the recording is adopted as the representative image in order for the still picture to include the title scene of the program. However, the embodiment is not limited thereto. The representative image may be obtained by using scene detection of a motion picture. For example, there is a conventional technique for detecting a commercial from a motion picture in a program stream. In this technique, a switching point of a motion picture is detected by using difference between frames, and a position of the commercial is detected based on the switching point of the motion picture. Therefore, the controller 14 may use this technique to detect the position of the commercial in the motion picture, and may obtain a scene (still picture) present immediately before or after the commercial as a representative image based on the detected position. For example, the controller 14 may detect a switching point in a motion picture from a commercial to a program content, and record a still picture located at a point a predetermined time elapses after the switching point as a representative image on the flash memory. As a result, it is possible to obtain accurately the title scene of the program. Therefore, it is possible to notify more effectively the user that the program has been recorded.

In the first embodiment, a part of program streams are selected from among the plurality of program streams based on the recording start time. However, the embodiment is not limited thereto. Based on the broadcast start time, a part of program streams may be selected from among the plurality of program streams. To do this, the broadcast start time paired with the program stream may be recorded on the recording medium 191 when the program stream is recorded. This allows a part of program streams to be selected based on the broadcast start time recorded in the recording medium 191.

In the first embodiment, a predetermined number of program streams are selected from among the plurality of program streams. However, the embodiment is not limited thereto. Any number of program streams may be selected.

In the first embodiment, the scheduled recording is performed based on the program guide. However, the embodiment is not limited thereto. Alternatively, the scheduled recording may be performed by specifying a date at which recording is performed, a time at which recording starts, a time at which recording ends, and a channel indicating a broadcast station, or the like. Any method can be used for the scheduled recording.

In the first embodiment, the recording operation based on the scheduled recording has been described. Alternatively, recording may be started based on a recording start instruction provided by user's operation on the remote controller, and recording may be stopped based on a recording stop instruction provided by user's operation on the remote controller.

In the first embodiment, the display image for menu is generated by generating the representative image from the program stream. However the embodiment is not limited thereto. In a case where the program information includes the representative image, the representative image included in the program information may be used in the display image for menu.

In the first embodiment, when the display image for menu is generated at the predetermined timing (when the power is turned off), the display images for menu are generated for all of the selected program streams. However, the embodiment is not limited thereto. In a case where the representative image and the program name of the selected program stream are recorded as the display image for menu on the flash memory 12, regarding representative images and program names only for program streams that are not recorded on the flash memory 12, the display image for menu may be generated from the program streams read from the recording medium 191. For example, in a case where the selected program streams are "Program A", "Program B", and "Program C", and information (representative images and program names) indicating the program for "Program B" and "Program C" are recorded as the display image for menu on the flash memory, the controller 14 may generate information representing the program only for "Program A". As a result, it takes less time for the controller 14 to generate the display image for menu.

In the description of the first embodiment, when the selection item "VIEW RECORDED PROGRAM" is selected, the display image for menu is displayed. However, this arrangement is not limited to the case of selection of "VIEW RECORDED PROGRAM". The concept of the first embodiment can also be applied to cases where the selection item of "VIEW STILL PICTURE" or "VIEW RECORDED VIDEO" is selected. Specifically, when the selection item "VIEW STILL PICTURE" is selected, a part or all still picture(s) recorded on the recording medium may be displayed in a manner, as shown in FIG. 9 and FIGS. 10A to 10C, that the image displayed on the top of overlaid images is switched every predetermined time interval with the images partially overlaid. Likewise, when the selection item "View Recoded Video" is selected, a part or all still picture(s) recorded on the recording medium may be displayed in a manner, as shown in FIG. 9 and FIGS. 10A to 10C, that the image displayed on the top of overlaid images is switched every predetermined time interval with the images partially overlaid.

In the first embodiment, the display image for menu 55 includes the representative image and the information about the program name and the like of the program corresponding to the representative image displayed on the top of the overlaid images. However, the information included in the display image for menu 55 is not limited thereto. The display image for menu 55 may include either one of the representative image and the program information (text information) such as the program name. In other words, the display image for menu 55 may include any information as long as the information represents the recorded program.

The specific embodiments have been described herein. However, many various other variations, modifications, and other uses are obvious to a person skilled in the art.

The present invention can be applied to a recorder for an optical disk such as a BD and a DVD. Further, the present invention can be applied to a system LSI and the like equipped in a recorder, a television receiver, and the like.

What is claimed is:

1. A controller connectable to a recording medium that stores a plurality of program streams and information about recording of each program stream, comprising:

a display controller operable to control a display device; and a receiving unit operable to receive an instruction provided by a user, wherein the display controller controls the display device to display a menu image including a plurality of selection items, when the receiving unit receives an instruction for selecting a predetermined item from among the plurality of selection items, the display controller controls the display device to display the menu image including not only the plurality of selection items but also representative images representing programs corresponding to at least a part of the plurality of the program streams recorded on the recording medium, and when the menu image includes a plurality of representative images, the display controller switches automatically positions of the representative images in the menu image at every predetermined time.

2. The controller according to claim 1, wherein the display controller selects a part of the plurality of program streams recorded on the recording medium based on a time at which the program stream is recorded, and generates the representative image representing the program, included in the menu image from the selected program stream.

3. The controller according to claim 1 further comprising a detector operable to detect a change in a recording state of the program stream recorded on the recording medium,
wherein when the detector detects the change in the recording state of the program stream recorded on the recording medium, the display controller generates the representative image representing the program included in the menu image.

4. The controller according to claim 1, wherein when the receiving unit receives an instruction for turning off a power supply of a device including the controller, the display controller generates representative image representing the program included in the menu image.

5. The controller according to claim 1 further comprising a determining unit operable to determine whether the program stream recorded on the recording medium has been viewed or not,
wherein the display controller generates the representative image representing the program included in the menu image, based on the result of determination by the determining unit.

6. The controller according to claim 1, wherein the representative image representing the program is a still picture or a motion picture in the program stream located at a point when a predetermined time elapses from the beginning point of the program.

7. The controller according to claim 1, wherein the menu image further includes information representing a program name of a program corresponding to the program stream.

8. The controller according to claim 1 further comprising a scene detector operable to detect a switching of a scene in the program stream,
wherein the representative image representing the program is a still picture or a motion picture located immediately before or immediately after the change of the scene.

9. The controller according to claim 1, wherein the predetermined selection item is an item that is selected to execute a function of reproducing the program stream recorded on the recording medium.

10. The controller according to claim 1, wherein a part of the plurality of selection items is related to at least a part of the plurality of the program streams recorded on the recording medium.

11. A recording device comprising:
a recording medium operable to store a plurality of program streams and information about recording of each program stream;
a receiving unit operable to receive an instruction provided by a user; and
a controller operable to control display of the program stream recorded on the recording medium on a display device,
wherein the controller controls the display device to display a menu image including a plurality of selection items, and
when the receiving unit receives an instruction for selecting a predetermined item from among the plurality of selection items, the controller controls the display device to display the menu image including not only the plurality of selection items but also representative images representing programs corresponding to at least a part of the plurality of the program streams recorded on the recording medium, and
when the menu image includes a plurality of representative images, the display controller switches automatically positions of the representative images in the menu image at every predetermined time.

12. The recording device according to claim 11, wherein a part of the plurality of selection items is related to at least a part of the plurality of the program streams recorded on the recording medium.

13. A method for displaying a menu image including a plurality of selection items on a display device,
wherein the plurality of selection items include an item that is selected to execute a function of reproducing a program stream recorded on a recording medium, and
the method includes:
receiving operation performed by a user on a menu image;
causing the display device to display the menu image including plurality of selection items and representative images representing a program corresponding to the program stream recorded on the recording medium, when an operation for selecting an item for reproducing a program stream from among the plurality of selection items is received on the menu image,
wherein
when the menu image includes a plurality of representative images, the display controller switches automatically positions of the representative images in the menu image at every predetermined time.

14. The method according to claim 13, wherein a part of the plurality of selection items is related to at least a part of the plurality of the program streams recorded on the recording medium.

* * * * *